United States Patent
Zhang et al.

(10) Patent No.: US 11,431,263 B2
(45) Date of Patent: Aug. 30, 2022

(54) SOLID-STATE TRANSFORMER HAVING UNINTERRUPTED OPERATION ABILITY UNDER AC/DC FAULT AND CONTROL METHOD THEREOF

(71) Applicant: SHANGHAI JIAO TONG UNIVERSITY, Shanghai (CN)

(72) Inventors: Jianwen Zhang, Shanghai (CN); Yixin Zhang, Shanghai (CN); Weixin Fang, Shanghai (CN); Jianqiao Zhou, Shanghai (CN); Gang Shi, Shanghai (CN); Xu Cai, Shanghai (CN); Jiacheng Wang, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 0 days.

(21) Appl. No.: 17/667,585

(22) Filed: Feb. 9, 2022

(65) Prior Publication Data
US 2022/0166343 A1 May 26, 2022

Related U.S. Application Data

(63) Continuation of application No. PCT/CN2019/110680, filed on Oct. 11, 2019.

(30) Foreign Application Priority Data

Aug. 12, 2019 (CN) .......................... 201910746562.3

(51) Int. Cl.
*H02M 7/483* (2007.01)
*H02M 1/00* (2006.01)

(52) U.S. Cl.
CPC ....... *H02M 7/4835* (2021.05); *H02M 1/0095* (2021.05); *H02M 7/4833* (2021.05); *H02M 1/007* (2021.05)

(58) Field of Classification Search
CPC ............. H02M 7/4835; H02M 1/0095; H02M 7/4833; H02M 1/007; H02M 1/32
See application file for complete search history.

(56) References Cited

U.S. PATENT DOCUMENTS

| 6,218,744 B1 | 4/2001 | Zahrte, Sr. et al. |
| 6,340,851 B1 * | 1/2002 | Rinaldi ................... H02M 7/49 |
| | | 307/82 |

(Continued)

FOREIGN PATENT DOCUMENTS

| CN | 103701145 A | 4/2014 |
| CN | 105680488 A | 6/2016 |

(Continued)

OTHER PUBLICATIONS

Zhou, J., et al. "Family of Modular Multilevel Converter (MMC) Based Solid State Transformer (SST) Topologies for Hybrid AC/DC Distribution Grid Applications." 2018 IEEE International Power Electronics and Application Conference and Exposition (PEAC) IEEE, Nov. 2018.

*Primary Examiner* — Yusef A Ahmed
(74) *Attorney, Agent, or Firm* — True Shepherd LLC; Andrew C. Cheng

(57) ABSTRACT

Disclosed is a solid-state transformer having an uninterrupted operation ability under an AC/DC fault, in which bridge arms of a hybrid modular multilevel converter include half-bridge submodules and full-bridge submodules. The half-bridge submodules and the full-bridge submodules are connected with input ends of isolated dual-active-bridge converters via DC capacitors of the half-bridge submodules and full-bridge submodules; output ends of the isolated dual-active-bridge converters are connected in parallel to form a low-voltage DC bus; and a three-phase full-bridge inverter is connected to the low-voltage DC bus. The solid-state transformer may be provided with four ports including (Continued)

a medium-voltage AC port, a medium-voltage DC port, a low-voltage DC port and a low-voltage AC port which are beneficial to the interconnection of multi-voltage-level and multi-form AC/DC hybrid distribution grids. The solid-state transformer has the uninterrupted operation ability under the AC/DC fault.

8 Claims, 7 Drawing Sheets

(56) References Cited

U.S. PATENT DOCUMENTS

| | | | |
|---|---|---|---|
| 8,816,533 B2 | 8/2014 | Navarro et al. | |
| 9,065,377 B2* | 6/2015 | Xu | H02M 7/493 |
| 9,372,493 B2* | 6/2016 | Aiello | H02M 7/483 |
| 9,564,891 B1 | 2/2017 | Bixby | |
| 9,893,633 B1* | 2/2018 | Li | H02M 3/33546 |
| 10,069,430 B2* | 9/2018 | Sahoo | H02P 27/08 |
| 10,454,366 B1* | 10/2019 | Li | H02M 1/4233 |
| 10,554,144 B2* | 2/2020 | Cao | H02M 5/4585 |
| 10,581,341 B2* | 3/2020 | Malipaard | H02M 7/003 |
| 10,862,312 B2* | 12/2020 | Sun | H02M 7/5387 |
| 2008/0304300 A1* | 12/2008 | Raju | H02M 7/217 363/125 |
| 2013/0062958 A1* | 3/2013 | Erickson, Jr. | H02S 20/25 307/82 |
| 2014/0265588 A1* | 9/2014 | McCleer | H02M 7/5387 363/132 |
| 2014/0268888 A1* | 9/2014 | Lv | H02M 5/225 363/10 |
| 2015/0124506 A1* | 5/2015 | Sahoo | H02M 1/0095 363/126 |
| 2016/0020628 A1* | 1/2016 | Guo | H02M 7/537 307/72 |
| 2016/0268915 A1* | 9/2016 | Lin | H02M 1/32 |
| 2016/0380556 A1* | 12/2016 | Peng | H02M 1/12 363/71 |
| 2017/0047860 A1* | 2/2017 | Fujii | H02M 7/4833 |
| 2017/0054294 A1* | 2/2017 | Lyu | H02J 3/01 |
| 2018/0069469 A1* | 3/2018 | Gupta | H02M 1/32 |
| 2018/0069488 A1* | 3/2018 | Mukunoki | H02M 7/48 |
| 2018/0091037 A1* | 3/2018 | Zhao | H02M 3/3376 |
| 2018/0166972 A1* | 6/2018 | Qi | H02M 7/219 |
| 2018/0287509 A1* | 10/2018 | Fujii | H02M 7/48 |
| 2019/0044427 A1* | 2/2019 | Fujii | H02M 7/48 |
| 2019/0052177 A1* | 2/2019 | Lu | H02M 7/217 |
| 2019/0115840 A1* | 4/2019 | Li | H02M 7/7575 |
| 2019/0199096 A1* | 6/2019 | Kish | H02M 3/155 |
| 2019/0267898 A1* | 8/2019 | Elserougi | H02M 3/158 |
| 2020/0220355 A1* | 7/2020 | Xie | H02M 7/53871 |
| 2021/0111629 A1* | 4/2021 | Gray | H02M 3/33592 |
| 2021/0119449 A1* | 4/2021 | Wang | H02J 3/004 |
| 2021/0203247 A1* | 7/2021 | Zhang | H02M 1/0012 |
| 2021/0408937 A1* | 12/2021 | Bhattacharya | H02M 1/0003 |
| 2022/0021298 A1* | 1/2022 | Luo | H02M 3/33573 |

FOREIGN PATENT DOCUMENTS

| | | |
|---|---|---|
| CN | 107834830 A | 3/2018 |
| CN | 108711876 A | 10/2018 |
| CN | 109067218 A | 12/2018 |
| CN | 109361214 A | 2/2019 |
| CN | 109802421 A | 5/2019 |
| CN | 109830978 A | 5/2019 |
| CN | 109980948 A | 7/2019 |
| CN | 110112942 A | 8/2019 |

* cited by examiner

SOLID-STATE TRANSFORMER HAVING UNINTERRUPTED OPERATION ABILITY UNDER AC/DC FAULT AND CONTROL METHOD THEREOF

CROSS-REFERENCE TO RELATED APPLICATIONS

This application is a continuation of International Patent Application No. PCT/CN2019/110680 with a filing date of Nov. 10, 2019, designating the United States, now pending, and further claims priority to Chinese Patent Application No. 201910746562.3 with a filing date of Aug. 12, 2019. The content of the aforementioned applications, including any intervening amendments thereto, are incorporated herein by reference.

TECHNICAL FIELD

The present invention relates to the fields such as an intelligent distribution grid technology and a power electronic technology in a power system, in particular to a topology of a hybrid modular multilevel solid-state transformer having an uninterrupted operation ability under an Alternating Current (AC)/Direct Current (DC) fault and a control method of the solid-state transformer.

BACKGROUND OF THE PRESENT INVENTION

A renewable energy source is frequently connected to a distribution grid in a form of distributed power so as to be converted into electric energy to be supplied to terminal users. However, a traditional distribution grid operates in a mode mainly based on one-way radial power supply led by a supplier, primary control equipment (an on-load voltage regulator, an interconnection switch and the like) for power distribution is deficient in regulation and control ability, and therefore, it is difficult to meet the demand of high-precision real-time operation optimization of the distribution grid when the renewable energy source and load fluctuate frequently. With the continuous increment of the connection number of distributed power sources, the rapid popularization of electric vehicles and the continuous increment of stored energy and controllable loads, an existing distribution grid architecture has been difficult to meet the demands of new energy source consumption and flexible regulation and control and user demands on environment protection, power supply reliability, electric energy quality and high-quality service.

Therefore, with the development of a power electronic technology, a power distribution system will form a net-like multi-voltage-grade AC/DC hybrid power distribution architecture via a solid-state transformer in the future. The complication of the distribution grid also raises serious challenges to the AC/DC fault handling ability of the solid-state transformer. The challenges are mainly from two aspects. The first challenge is from a relay protection technology of the distribution grid. At present, a relay protection technology for an AC network is relatively mature and low in protection difficulty; however, a relay protection technology for a medium/high-voltage DC distribution grid is not mature and relatively high in protection difficulty, and therefore, the current relatively effective DC fault handling solution at present is to adopt a topology of a converter having a DC fault blocking ability. The second challenge is from the power supply reliability of the distribution grid. In an AC/DC hybrid distribution grid, a plurality of AC/DC networks with different voltage grades are directly coupled via a plurality of ports of the solid-state transformer, so that the energy balance relationship among all the ports is more complicated. When a circuit connected to a certain port is removed due to a short-circuit fault, a traditional control method cannot achieve balance control of energy in a device, and thus, the solid-state transformer is forced to be out of operation. The number of ports of the solid-state transformer is larger, a plurality of port networks may be affected at the same time since the device is out of operation, and therefore, the power supply reliability of the AC/DC hybrid distribution grid is seriously affected. In conclusion, it is necessary to design a topology of a solid-state transformer having an uninterrupted operation ability under an AC/DC fault and a corresponding uninterrupted operation control strategy to ensure that the solid-state transformer has the uninterrupted operation ability under a short-circuit fault of a network connected to any one port, so that the normal operation of non-fault ports is ensured, and the power supply reliability of the distribution grid is improved.

By retrieval, Zhou Jianqiao et al. proposed a topological structure of a modular solid-state transformer based on a Modular Multilevel Converter (MMC) and dual active bridges (DAB) in a paper "Family of MMC-based SST topologies for Hybrid ACDC Distribution Grid Applications" (2018) published in the Second Power Electronics and Application Conference and Exposition (PEAC), by which the interconnection of various AC/DC distribution grids is achieved. However, in the topology, the ability of coping medium/low-voltage AC/DC faults is not taken into account, the uninterrupted operation of the device at the non-fault ports under the fault of the network connected to a certain port cannot be achieved, and thus, the power supply reliability of the distribution grid is affected.

SUMMARY OF PRESENT INVENTION

For overcoming defects in the prior art, the purpose of the present invention is to provide a novel modular multilevel solid-state transformer having an uninterrupted operation ability under an AC/DC fault and a control method therefor, by which the uninterrupted operation of the solid-state transformer under an external AC/DC grid fault can be achieved, so that the power supply reliability of multi-voltage-grade and multi-form AC/DC hybrid distribution grids is improved.

According to a first aspect of the present invention, provided is a solid-state transformer having an uninterrupted operation ability under an AC/DC fault, including a hybrid modular multilevel converter (MMC), a plurality of isolated dual-active-bridge converters (DAB) and a three-phase full-bridge inverter, wherein bridge arms of the hybrid modular multilevel converter (MMC) consist of half-bridge submodules and full-bridge submodules, the half-bridge submodules and the full-bridge submodules are interconnected with input ends of the isolated dual-active-bridge converters (DAB) via DC capacitors of the submodules, output ends of the plurality of isolated dual-active-bridge converters (DAB) are connected in parallel to form a low-voltage DC bus, and the three-phase full-bridge inverter is connected to the low-voltage DC bus, wherein the modular multilevel converter (MMC) is provided with a medium-voltage DC port and a medium-voltage AC port, the medium-voltage AC port is used to be connected with a medium-voltage AC distribution grid, and the medium-voltage DC port is used to be connected with a medium-voltage DC distribution grid;

the output ends of the isolated dual-active-bridge converters (DAB) are connected in parallel to form a low-voltage DC port, and the low-voltage DC port is used to be connected with a low-voltage DC distribution grid, a distributed new energy source, stored energy and other flexible loads; and the low-voltage DC bus forms a low-voltage AC port via the three-phase full-bridge inverter, and the low-voltage AC port is used to be connected with a low-voltage AC distribution grid.

When a short-circuit fault occurs in a network connected to any one port of the solid-state transformer, by locking the fault port, the normal operation of other ports is not affected, so that the power supply reliability of an AC/DC hybrid distribution grid is improved.

According to a second aspect of the present invention, provided a control method for a solid-state transformer having an uninterrupted operation ability under an AC/DC fault, including one or more of the following methods.

When port networks are stable, the solid-stage transformer is in a normal operation condition, and energy flow among all the ports of the device is controlled to the stable operation of the port networks, wherein the MMC controls the reactive power of an AC side and maintains the voltage of a medium-voltage DC side to be stable by adopting DC voltage-reactive power double loop control; loop current suppression and the voltage balance of the capacitors of the submodules are achieved by additional duty ratio control in a modulation voltage; the DAB controls active power by virtue of a phase shifting angle so as to maintain the low-voltage DC bus to be stable; and a three-phase PWM inverter maintains a voltage of a low-voltage AC side to be stable by constant AC voltage control.

When a short-circuit fault occurs in a network connected to the medium-voltage DC port of the solid-stage transformer, the solid-state transformer has a DC fault current blocking ability and may block a DC fault current by changing a control strategy to keep the voltage of the medium-voltage DC port at zero and keep other ports to normally operate, wherein an MMC station controls the reactive power of the AC side and maintains the voltages of the capacitors of the submodules of the MMC to be constant by adopting total capacitor voltage-reactive power double loop control, so that the rapid input of a device after the fault is cleared is facilitated; a full-bridge submodule valve section and a half-bridge submodule valve section respectively adopt separate modulation strategies so that the cooperative work of the hybrid submodules and the equalized transmission of the active power at a low-voltage DC side among all DAB units are achieved; loop current suppression and the voltage balance of the capacitors of the submodules are achieved by additional duty ratio control in a modulation voltage; the DAB controls active power by virtue of a phase shifting angle so as to maintain the low-voltage DC bus to be stable; and the three-phase PWM inverter maintains a voltage of a low-voltage AC side to be stable by constant AC voltage control. Thus, uninterrupted operation of the non-fault ports under the fault of the medium-voltage DC port is achieved.

When a short-circuit fault occurs in a network connected to the medium-voltage AC port of the solid-state transformer, the device adopts a circuit breaker at a medium-voltage AC side to block a fault current and isolate a medium-voltage AC fault port, and a control strategy is changed to keep other ports to normally operate, wherein the MMC adopts total capacitor voltage control to maintain the voltages of the capacitors of the submodules of the MMC to be balanced; the DAB controls active power by virtue of a phase shifting angle so as to maintain the voltage of the low-voltage DC bus to be stable; and the three-phase PWM inverter maintains a voltage of a low-voltage AC side to be stable by constant AC voltage control.

When a short-circuit fault occurs in a network connected to the low-voltage DC port of the solid-state transformer, the solid-state transform changes a control strategy to lock the DAB and a three-phase PWM inverter, isolate a medium-voltage DC fault port and keep the medium-voltage AC port and the medium-voltage DC port to normally operate, wherein the MMC controls the reactive power of the AC side and maintains the voltage of a medium-voltage DC side to be stable by adopting DC voltage-reactive power double loop control; and loop current suppression and the voltage balance of the capacitors of the submodules are achieved by additional duty ratio control in a modulation voltage.

When a short-circuit fault occurs in a network connected to the low-voltage AC port of the solid-state transformer, the solid-state transform changes a control strategy to lock a three-phase PWM inverter, isolate a low-voltage AC fault port and keep other ports to normally operate, wherein the MMC controls the reactive power of the AC side and maintains the voltage of a medium-voltage DC side to be stable by adopting DC voltage-reactive power double loop control; loop current suppression and the voltage balance of the capacitors of the submodules are achieved by additional duty ratio control in a modulation voltage; and the DAB controls active power by virtue of a phase shifting angle so as to maintain the low-voltage DC bus to be stable.

The above-mentioned several control methods provided by the present invention may be executed alone or at the same time.

Compared with the prior art, the technical solutions provided by the present invention have the following beneficial effects:

by using the solid-state transformer having the uninterrupted operation ability under the AC/DC fault and the control method therefor provided by the present invention, the solid-state transformer may be provided with the four ports including the medium-voltage AC port, the medium-voltage DC port, the low-voltage DC port and the low-voltage AC port which are beneficial to the construction of multi-voltage-grade and multi-form AC/DC hybrid distribution grids; and by using the solid-state transformer having the uninterrupted operation ability under the AC/DC fault and the control method therefor provided by the present invention, the solid-state transformer has the uninterrupted operation ability under the AC/DC fault, the rapid switching of an operation mode of a device under a fault of any one port of the solid-state transformer and the interrupted operation of non-fault ports can be achieved, and thus, the power supply reliability of the AC/DC hybrid distribution grids is improved.

DESCRIPTION OF THE DRAWINGS

By reading detailed descriptions of nonrestrictive embodiments with reference to the following accompanying drawings, other features, objectives and advantages of the present invention will become more apparent.

DETAILED DESCRIPTION OF PREFERRED EMBODIMENTS

The present invention will be described in detail below in conjunction with specific embodiments. The following embodiments will be beneficial for the skilled in the art to further understand the present invention, but are not intended to limit the present invention. It should be noted that the ordinary skill in the art may also make several variations and improvements without departing from the concept of the present invention, and these variations and improvements fall within the protection scope of the present invention.

Figure 1A:
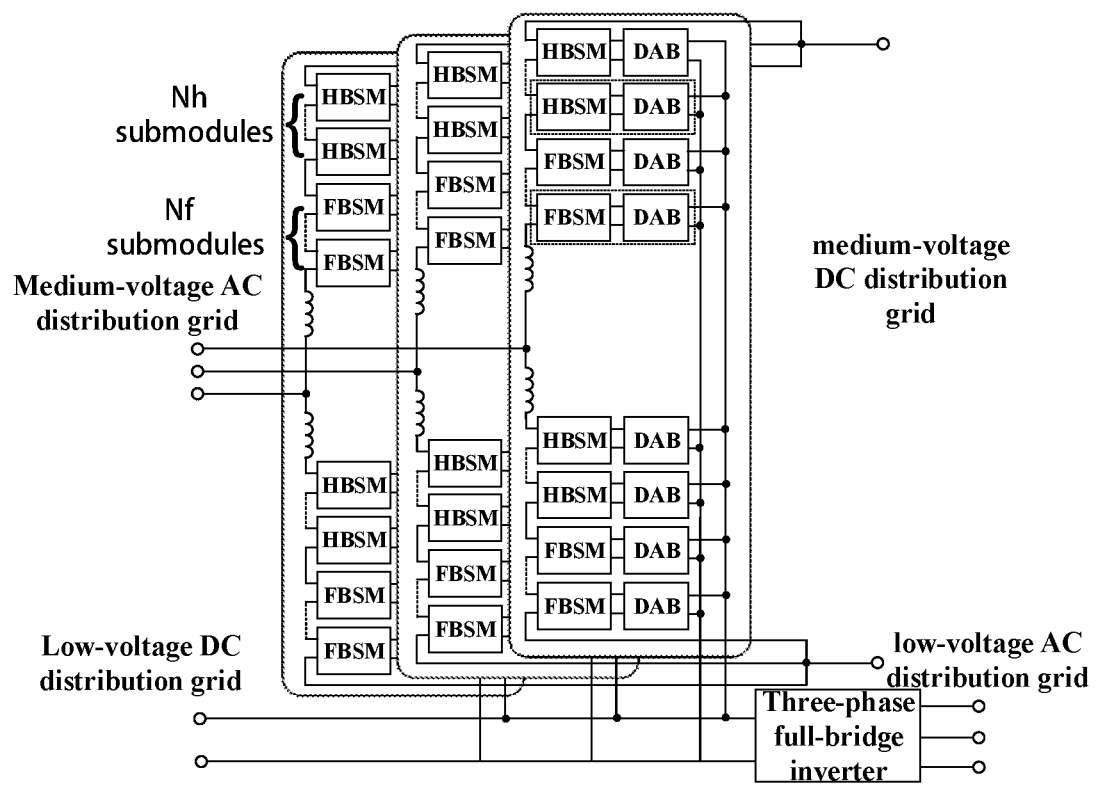
FIG. 1a and FIG. 1b show a schematic diagram showing a structure of a solid-state transformer having an uninterrupted operation ability under an AC/DC fault in an embodiment of the present invention.
Figure 1B:
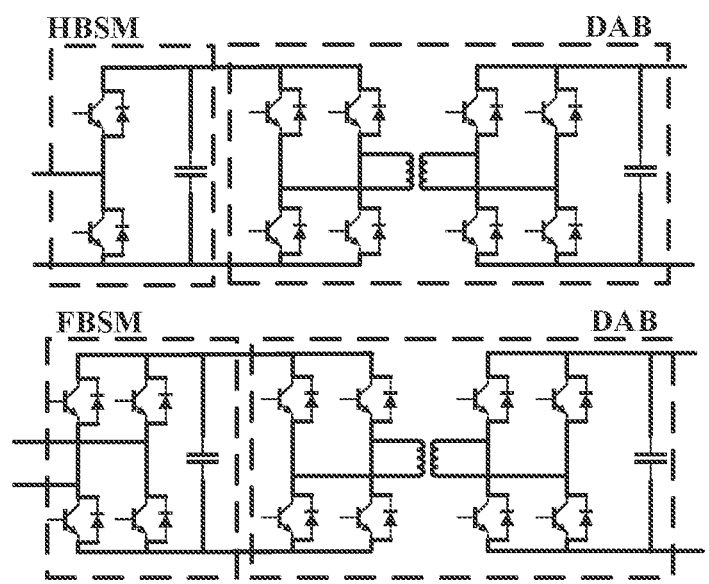

As shown in FIG. 1a and FIG. 1b, provided is a solid-state transformer having an uninterrupted operation ability under an AC/DC fault in an embodiment of the present invention. The solid-state transformer includes a hybrid modular multilevel converter (MMC), a plurality of isolated dual-active-bridge converters (DAB) and a three-phase full-bridge inverter, wherein bridge arms of the hybrid modular multilevel converter (MMC) consist of half-bridge submodules (HBSM) and full-bridge submodules (FBSM), the half-bridge submodules (HBSM) and the full-bridge submodules (FBSM) are interconnected with input ends of the isolated dual-active-bridge converters (DAB) via DC capacitors of the submodules, output ends of the plurality of isolated dual-active-bridge converters (DAB) are connected in parallel to form a low-voltage DC bus, and the three-phase full-bridge inverter is connected to the low-voltage DC bus, wherein the modular multilevel converter (MMC) is provided with a medium-voltage DC port and a medium-voltage AC port, the medium-voltage AC port is used to be connected with a medium-voltage AC distribution grid, and the medium-voltage DC port is used to be connected with a medium-voltage DC distribution grid; the output ends of the isolated dual-active-bridge converters (DAB) are connected in parallel to form a low-voltage DC port, and the low-voltage DC port is used to be connected with a low-voltage DC distribution grid, a distributed new energy source, stored energy and other flexible loads; and the low-voltage DC bus forms a low-voltage AC port via the three-phase full-bridge inverter, and the low-voltage AC port is used to be connected with a low-voltage AC distribution grid.

The solid-state transformer in the above-mentioned embodiment of the present invention may be provided with the four ports including the medium-voltage AC port, the medium-voltage DC port, the low-voltage DC port and the low-voltage AC port can be provided, wherein the medium-voltage AC port is connected with the medium-voltage AC distribution grid, the medium-voltage DC port is connected with the medium-voltage DC distribution grid, the low-voltage DC port is connected with the low-voltage DC distribution grid, the distributed new energy source, the stored energy and other flexible loads, the low-voltage AC port is connected with the low-voltage AC distribution grid, and therefore, they are beneficial to the interconnection of multi-voltage-grade and multi-form AC/DC hybrid distribution grids. When a short-circuit fault occurs in a network connected to any one port of the solid-state transformer, by locking the fault port, the normal operation of other ports is not affected, so that the power supply reliability of an AC/DC hybrid distribution grid is improved.

The hybrid modular multilevel converter (MMC), the plurality of isolated dual-active-bridge converters (DAB) and the three-phase full-bridge inverter in the above-mentioned embodiment of the present invention are all achieved by adopting the prior art As shown in FIG. 1b, a topological diagram of the half-bridge submodules (HBSM) and the full-bridge submodules (FBSM) is shown in the figure, wherein the upper part of FIG. 1b is a schematic diagram showing the connection between the half-bridge submodules (HBSM) and the isolated dual-active-bridge converters (DAB), the half-bridge submodules (HBSM) adopt a half-bridge two-level topology, and the isolated dual-active-bridge converters (DAB) adopt high-frequency isolation transformers. The lower part of FIG. 1b is a schematic diagram showing the connection between the full-bridge submodules (FBSM) and the isolated dual-active-bridge converters (DAB), the full-bridge submodules (FBSM) adopt a full-bridge two-level topology, and the isolated dual-active-bridge converters (DAB) adopt high-frequency isolation transformers. The capacitors in the half-bridge submodules (HBSM) and the full-bridge submodules (FBSM) are interconnected with the input ends of the isolated dual-active-bridge converters (DAB).

As shown in FIG. 2 to FIG. 6 which are schematic diagrams showing a control method for the solid-state transformer having the uninterrupted operation ability under the AC/DC fault in FIG. 1, when a short-circuit fault occurs in a network connected to any one port of the solid-state transformer, the fault port is locked by regulating a control method, and then, the normal operation of other ports is not affected, so that the power supply reliability of an AC/DC hybrid distribution grid is improved. The control method for the solid-state transformer under different working conditions will be briefly described below.

Figure 2:
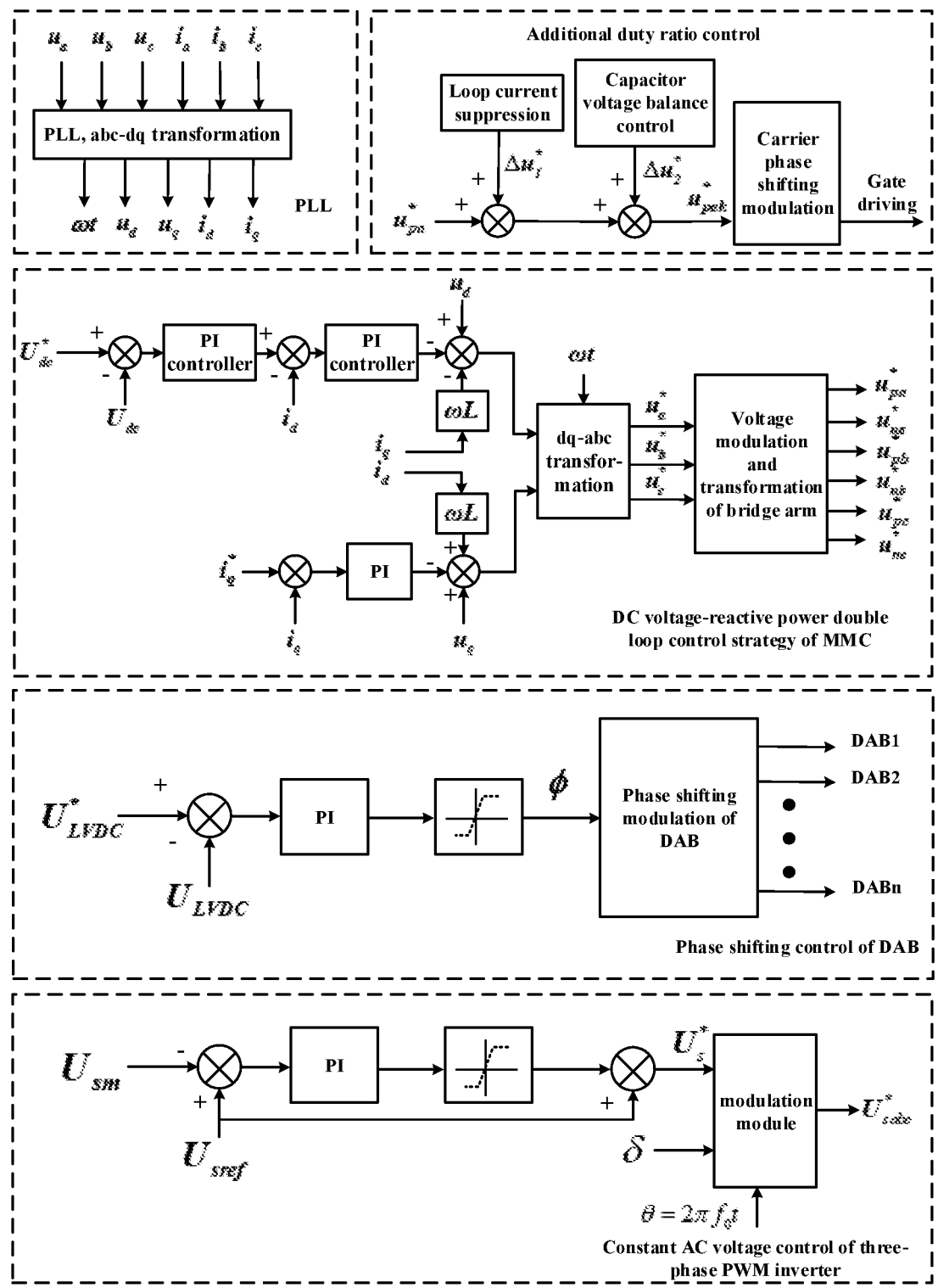
FIG. 2 is a control block diagram showing steady-state operation of a solid-state transformer under a normal working condition in an embodiment of the present invention.

Specifically, as shown in FIG. 2 which is a control block diagram showing a solid-state transformer under a normal working condition, when port networks are stable, the solid-state transformer is in the normal operation condition, and energy flow among all the ports of the device is controlled to maintain the stable operation of the port networks. Specifically, the specific control process is that: firstly, the phases and d-axis and q-axis components of a voltage and a current of a medium-voltage AC side are acquired by a phase-locked loop (PLL) and dq transformation, so that it is convenient for the hybrid modular multilevel converter (MMC) to achieve control; the hybrid modular multilevel converter (MMC) is provided with a medium-voltage DC port and a medium-voltage AC port which are respectively connected with a medium-voltage DC network and a medium-voltage AC network, the hybrid modular multilevel converter (MMC) adopts DC voltage-reactive power double loop control, and a DC voltage and reactive power are subjected to double closed loop control to obtain modulation voltage command values of the upper and lower bridge arms of each phase, so that the reactive power of the AC side is controlled, and the voltage of a medium-voltage DC side is maintained to be stable; a corresponding compensation amount is additionally increased in the modulation voltage command value of each bridge arm by additional duty ratio control, and a corresponding switching tube is driven by carrier phase shifting modulation, so that loop current suppression and the voltage balance of the capacitors of the submodules are achieved; the input sides of the isolated dual-active-bridge converters (DAB) are connected with the DC sides of the submodules of the modular multilevel converter (MMC), the output sides thereof are connected in parallel to provide a low-voltage DC port connected with a low-voltage DC distribution grid, a distributed new energy source, stored energy and other flexible loads, the isolated dual-active-bridge converters (DAB) adopt phase shifting angle control, the voltage of the low-voltage DC bus is subjected to single closed loop control to obtain phase shifting angle command values of all the isolated dual-active-bridge converters (DAB), so that the voltage of the low-voltage DC bus is maintained to be stable; and the DC side of the three-phase PWM inverter is connected with the low-voltage DC port provided by the device, the AC side thereof is provided with a low-voltage AC port connected with a low-voltage AC distribution network, the three-phase PWM inverter adopts constant AC voltage control, and a voltage of a low-voltage AC side is subjected to single closed loop control to obtain a modulation voltage command value of the low-voltage AC side, so that the voltage of the low-voltage AC side is maintained to be stable.

Figure 3:
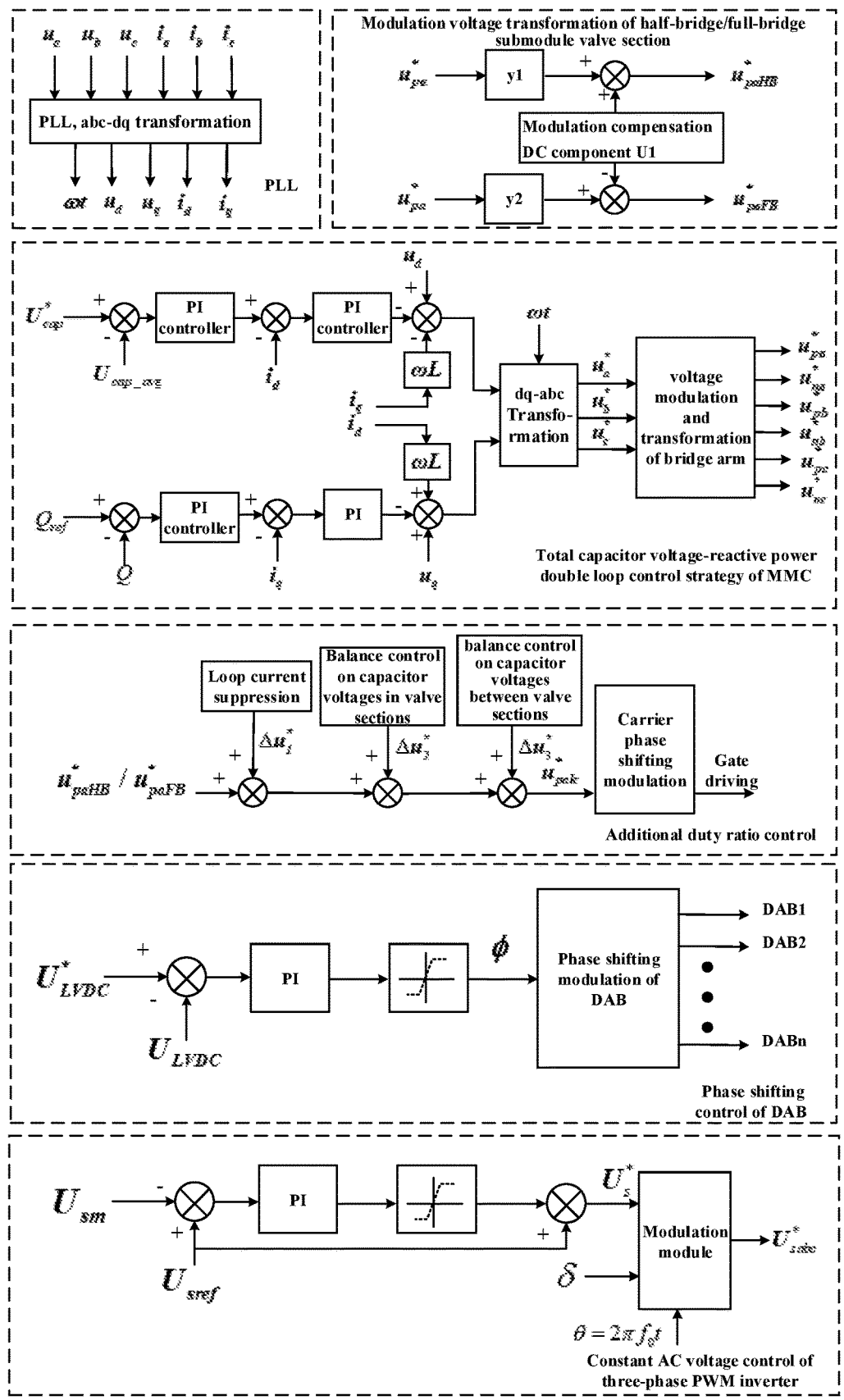
FIG. 3 is a control block diagram showing system operation of a solid-state transformer under the condition that a short-circuit fault occurs in a network connected to a medium-voltage DC port in an embodiment of the present invention.

As shown in FIG. 3 which is a control block diagram showing a solid-state transformer under a fault of a medium-voltage DC port, when a short-circuit fault occurs in a network connected to the medium-voltage DC port of the solid-stage transformer, the solid-state transformer has a DC fault current blocking ability and may block a DC fault current by changing a control strategy to keep the voltage of the medium-voltage DC port at zero and keep other ports to normally operate. The specific control process is that: firstly, the phases and d-axis and q-axis components of a voltage and a current of a medium-voltage AC side are acquired by a phase-locked loop (PLL) and dq transformation, so that it is convenient for the hybrid modular multilevel converter (MMC) to achieve control; the hybrid modular multilevel converter (MMC) is provided with a medium-voltage AC port connected with a medium-voltage AC network, the hybrid modular multilevel converter (MMC) adopts total capacitor voltage-reactive power double loop control, and a total capacitor voltage and reactive power are subjected to double closed loop control to obtain modulation voltage command values of the upper and lower bridge arms of each phase, so that the reactive power of the AC side is controlled, and the total capacitor voltage of the hybrid modular multilevel converter (MMC) is maintained to be constant, so that the rapid input of a device after the fault is cleared is facilitated; a full-bridge submodule valve section and a half-bridge submodule valve section of the hybrid modular multilevel converter (MMC) respectively adopt separate modulation strategies so that the cooperative work of the hybrid submodules and the equalized transmission of the active power at a low-voltage DC side among all isolated dual-active-bridge converter (DAB) units are achieved; a corresponding compensation amount is additionally increased in the modulation voltage command value of each bridge arm by additional duty ratio control, and a corresponding switching tube is driven by carrier phase shifting modulation, so that loop current suppression and the voltage balance of the capacitors of the submodules are achieved; the input sides of the isolated dual-active-bridge converters (DAB) are connected with the DC sides of the submodules of the modular multilevel converter (MMC), the output sides thereof are connected in parallel to provide a low-voltage DC port connected with a low-voltage DC distribution grid, a distributed new energy source, stored energy and other flexible loads, the isolated dual-active-bridge converters (DAB) adopt phase shifting angle control, the voltage of the low-voltage DC bus is subjected to single closed loop control to obtain phase shifting angle command values of all the isolated dual-active-bridge converters (DAB), so that the voltage of the low-voltage DC bus is maintained to be stable; and the DC side of the three-phase PWM inverter is connected with the low-voltage DC port provided by the device, the AC side thereof is provided with a low-voltage AC port connected with a low-voltage AC distribution network, the three-phase PWM inverter adopts constant AC voltage control, and a voltage of a low-voltage AC side is subjected to single closed loop control to obtain a modulation voltage command value of the low-voltage AC side, so that the voltage of the low-voltage AC side is maintained to be stable.

A basic working principle of an uninterrupted control strategy under a fault of a DC port is briefly stated as follows. Wherein the medium-voltage AC side has a voltage amplitude Um and a current amplitude Im, the full-bridge submodules and the half-bridge submodules adopt the same rated voltage Uc, and the number of the submodules included in the half-bridge submodule valve section and the full-bridge submodule valve section is n:

firstly, in order to avoid influences of the short-circuit fault at the medium-voltage DC side to the operation of the device, a modulation voltage of the medium-voltage DC side is required to be kept at a low voltage, that is, the sum of modulation voltage values of an upper bridge arm and a lower bridge arm is a low voltage, and the voltage of the port is reduced to be zero under a limit condition in cooperation with the short-circuit tolerance of the medium-voltage DC port.

Secondly, in order to ensure the normal operation of the medium-voltage AC side, the voltage of the medium-voltage AC port is required to be maintained to be equal to an AC modulation voltage. With a phase A as an example, the modulation voltages of the upper and lower bridge arms need meet the conditions:

$$\begin{cases} u_{ap} = -U_m\sin(\omega t) \\ u_{an} = U_m\sin(\omega t) \end{cases}$$

wherein $u_{ap}$ and $u_{an}$ are the modulation voltage command values of the upper and lower bridge arms of the phase A of the MMC, $U_m$ is a phase voltage amplitude of the medium-voltage AC side, and $\omega t$ is the phase of the phase A.

Finally, in order to ensure the normal operation of the low-voltage DC side and the low-voltage AC side, the active power of the low-voltage sides is ensured to be equally and stably transmitted to the isolated dual-active-bridge converters (DAB) via the submodules of the hybrid modular multilevel converter (MMC), and therefore, currents of the bridge arms and switching functions of the submodules are required to be analyzed. With the phase A as an example, the currents of the upper bridge arms and the lower bridge arm are respectively expressed as:

$$\begin{cases} I_{ap} = -\frac{1}{2}I_a(t) = -\frac{1}{2}I_m\sin(\omega t + \varphi) \\ I_{an} = +\frac{1}{2}I_a(t) = +\frac{1}{2}I_m\sin(\omega t + \varphi) \end{cases}$$

wherein $I_{ap}$ and $I_{an}$ are current values of the upper and lower bridge arms of the phase A of the MMC, $I_a(t)$ is the current of the phase A of the medium-voltage AC side, $I_m$ is a current amplitude of the phase A, cot is the phase of the phase A, and φ is a power factor angle.

With the phase A as an example, the voltage of the upper bridge arm of the phase A consists of a half-bridge submodule valve section and a full-bridge submodule valve section, in order to achieve equalized transmission of low-voltage DC power, separate modulation strategies are required to be adopted for the two submodules, and expressions of the modulation voltages are shown as follows:

$$u_{apHB} = U_1 - y_1 U_m \sin(\omega t)$$
$$u_{apFB} = -U_1 - y_2 U_m \sin(\omega t)$$
$$y_1 + y_2 = 1$$

wherein $U_1$, $y_1$ and $y_2$ are modulation command coefficients and are set according to system operation characteristics; and $u_{apHB}$ and $u_{apFB}$ are modulation voltage command values of the half-bridge submodule valve section and the full-bridge submodule valve section. In order to ensure that the voltages are varied within voltage variation ranges of the submodule valve sections, values of the $U_1$, $y_1$ and $y_2$ need meet the following conditions:

$$\begin{cases} 0 \le u_{apHB} \le nU_c \\ -nU_c \le u_{apFB} \le nU_c \end{cases}$$

and thus, average switching functions of the half-bridge submodules and the full-bridge submodules may be obtained:

$$\begin{cases} S_{apHB} = \frac{U_1 - y_1 U_m \sin(\omega t)}{nU_c} \\ S_{apFB} = \frac{-U_1 - y_2 U_m \sin(\omega t)}{nU_c} \end{cases}$$

wherein $S_{apHB}$ and $S_{apFB}$ are the average switching functions of the half-bridge submodules and the full-bridge submodules.

A current flowing into DC sides of the submodules is expressed as:

$$\begin{cases} i_{SMapHB} = S_{apHB} I_{ap} = \frac{U_m I_m y_1 \cos\varphi}{4nU_c} - \\ \frac{U_1 I_m \sin(\omega t + \varphi)}{2nU_c} - \frac{U_m I_m y_1 \cos(2\omega t + \varphi)}{4nU_c} \\ i_{SMapFB} = S_{apFB} I_{ap} = \frac{U_m I_m y_2 \cos\varphi}{4nU_c} + \\ \frac{U_1 I_m \sin(\omega t + \varphi)}{2nU_c} - \frac{U_m I_m y_2 \cos(2\omega t + \varphi)}{4nU_c} \end{cases}$$

in which $i_{SMmapHB}$ and $i_{SMapFB}$ are DC components and flow into the low-voltage DC side via a later-stage isolated dual-active-bridge converter (DAB) unit to generate active power; and other components are AC components acting on the capacitors of the submodules to generate voltage fluctuation of the capacitors, which does not affect power transmission at the low-voltage sides, and therefore, an equation for power transmission from single half-bridge submodule and single full-bridge submodule to the isolated dual-active-bridge converter (DAB) units is expressed as follows:

$$\begin{cases} P_{DABapHB} = \frac{U_m I_m y_1 \cos\varphi}{4n} \\ P_{DABapFB} = \frac{U_m I_m y_2 \cos\varphi}{4n} \end{cases}$$

Known by calculation and analysis, the equalized and stable transmission of the active power at the low-voltage DC side in an uninterrupted operation state is achieved by selecting an appropriate voltage modulation command coefficient.

The above-mentioned description takes the phase A as an example and is also suitable for other phases, the descriptions thereof are omitted herein.

Figure 4:
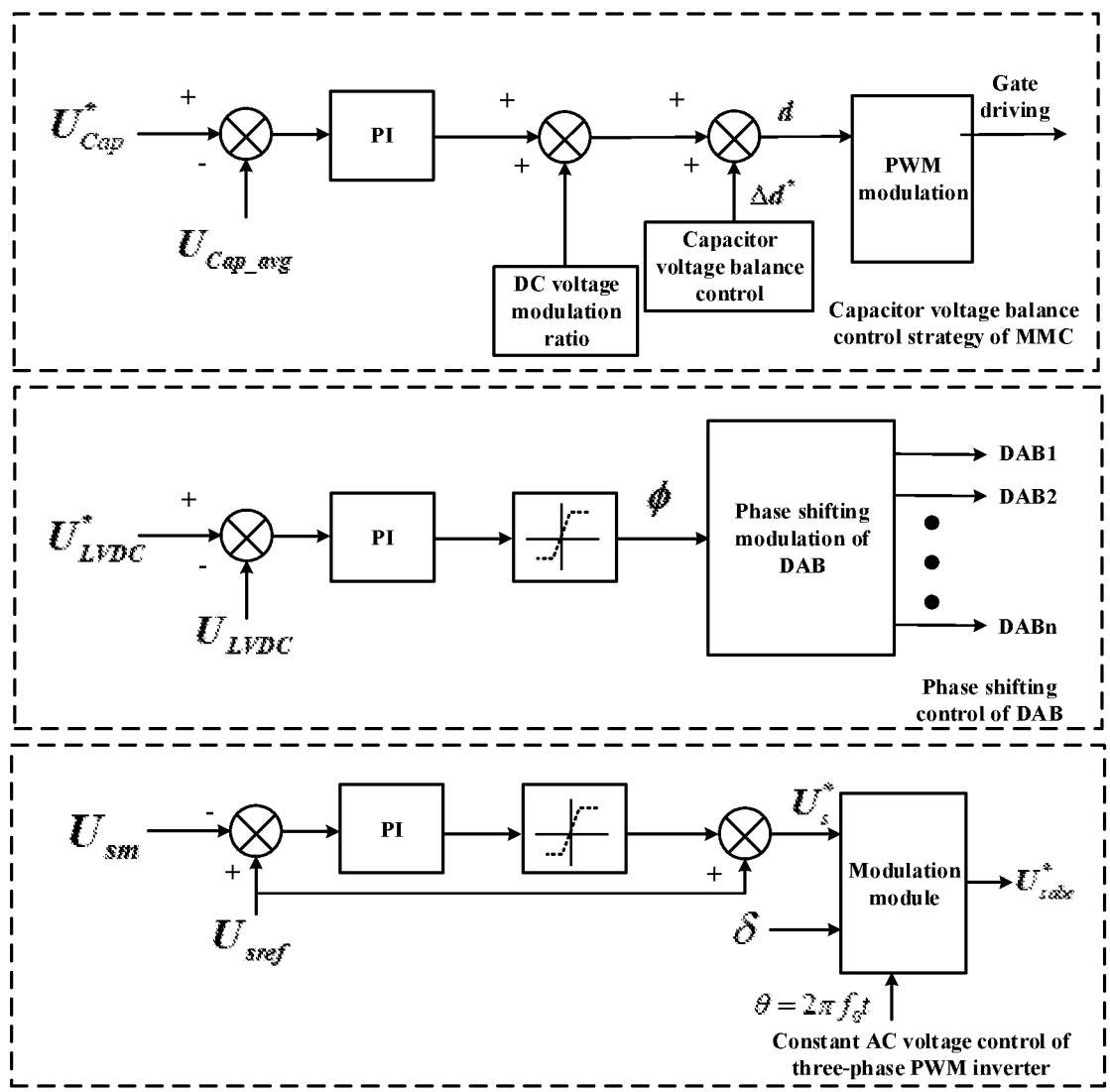
FIG. 4 is a control block diagram showing system operation of a solid-state transformer under the condition that a short-circuit fault occurs in a network connected to a medium-voltage AC port in an embodiment of the present invention.

As shown in FIG. 4 which is a control block diagram showing a solid-state transformer under a fault of a medium-voltage AC port, when a short-circuit fault occurs in a network connected to the medium-voltage AC port of the solid-state transformer, a circuit breaker at a medium-voltage AC side blocks a fault current and isolates a medium-voltage AC fault port, and a control strategy is changed to keep other ports to normally operate. The specific control process is that: the hybrid modular multilevel converter (MMC) is only provided with a medium-voltage DC port connected with a medium-voltage DC network, the hybrid modular multilevel converter (MMC) adopts total capacitor voltage control, a total capacitor voltage is subjected to single closed loop control, and a DC voltage modulation value and a compensation amount for voltage balance of capacitors are additionally increased, so that modulation voltage command values of all the submodules are obtained to maintain the voltage balance of the capacitors of the submodules of the hybrid modular multilevel converter (MMC); the input sides of the isolated dual-active-bridge converters (DAB) are connected with the DC sides of the submodules of the modular multilevel converter (MMC), the output sides thereof are connected in parallel to provide a low-voltage DC port connected with a low-voltage DC distribution grid, a distributed new energy source, stored energy and other flexible loads, the isolated dual-active-bridge converters (DAB) adopt phase shifting angle control, the voltage of the low-voltage DC bus is subjected to single closed loop control to obtain phase shifting angle command values of all the isolated dual-active-bridge converters (DAB), so that the voltage of the low-voltage DC bus is maintained to be stable; and the DC side of the three-phase PWM inverter is connected with the low-voltage DC port provided by the device, the AC side thereof is provided with a low-voltage AC port connected with a low-voltage AC distribution network, the three-phase PWM inverter adopts constant AC voltage control, and a voltage of a low-voltage AC side is subjected to single closed loop control to obtain a modulation voltage command value of the low-voltage AC side, so that the voltage of the low-voltage AC side is maintained to be stable.

Figure 5:
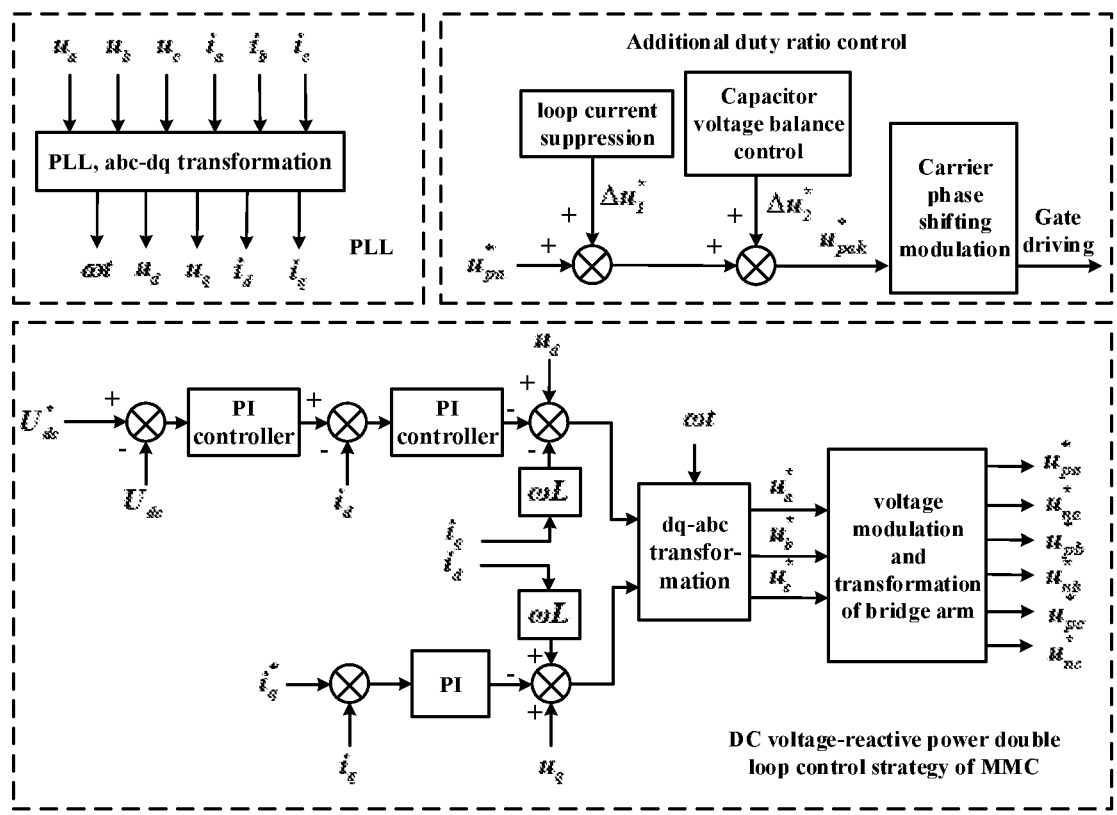
FIG. 5 is a control block diagram showing system operation of a solid-state transformer under the condition that a short-circuit fault occurs in a network connected to a low-voltage DC port in an embodiment of the present invention.

As shown in FIG. 5 which is a control block diagram showing a solid-state transformer under a fault of a low-voltage DC port, when a short-circuit fault occurs in a network connected to the low-voltage DC port of the solid-state transformer, the solid-state transform changes a control strategy to lock the isolated dual-active-bridge converters (DAB) and a three-phase PWM inverter, isolate a medium-voltage DC fault port and keep the medium-voltage AC port and the medium-voltage DC port to normally operate. The specific control process is that: firstly, the phases and d-axis and q-axis components of a voltage and a current of a medium-voltage AC side are acquired by a phase-locked loop (PLL) and dq transformation, so that it is convenient for the hybrid modular multilevel converter (MMC) to achieve control; the hybrid modular multilevel converter (MMC) is provided with a medium-voltage DC port and a medium-voltage AC port which are respectively connected with a medium-voltage DC network and a medium-voltage AC network, the hybrid modular multilevel converter (MMC) adopts DC voltage-reactive power double loop control, and a DC voltage and reactive power are subjected to double closed loop control to obtain modulation voltage command values of the upper and lower bridge arms of each phase, so that the reactive power of the AC side is controlled, and the voltage of a medium-voltage DC side is maintained to be stable; a corresponding compensation amount is additionally increased in the modulation voltage command value of each bridge arm by additional duty ratio control, and a corresponding switching tube is driven by carrier phase shifting modulation, so that loop current suppression and the voltage balance of the capacitors of the submodules are achieved; and the isolated dual-active-bridge converters (DAB) and the three-phase PWM inverter stop working.

Figure 6:
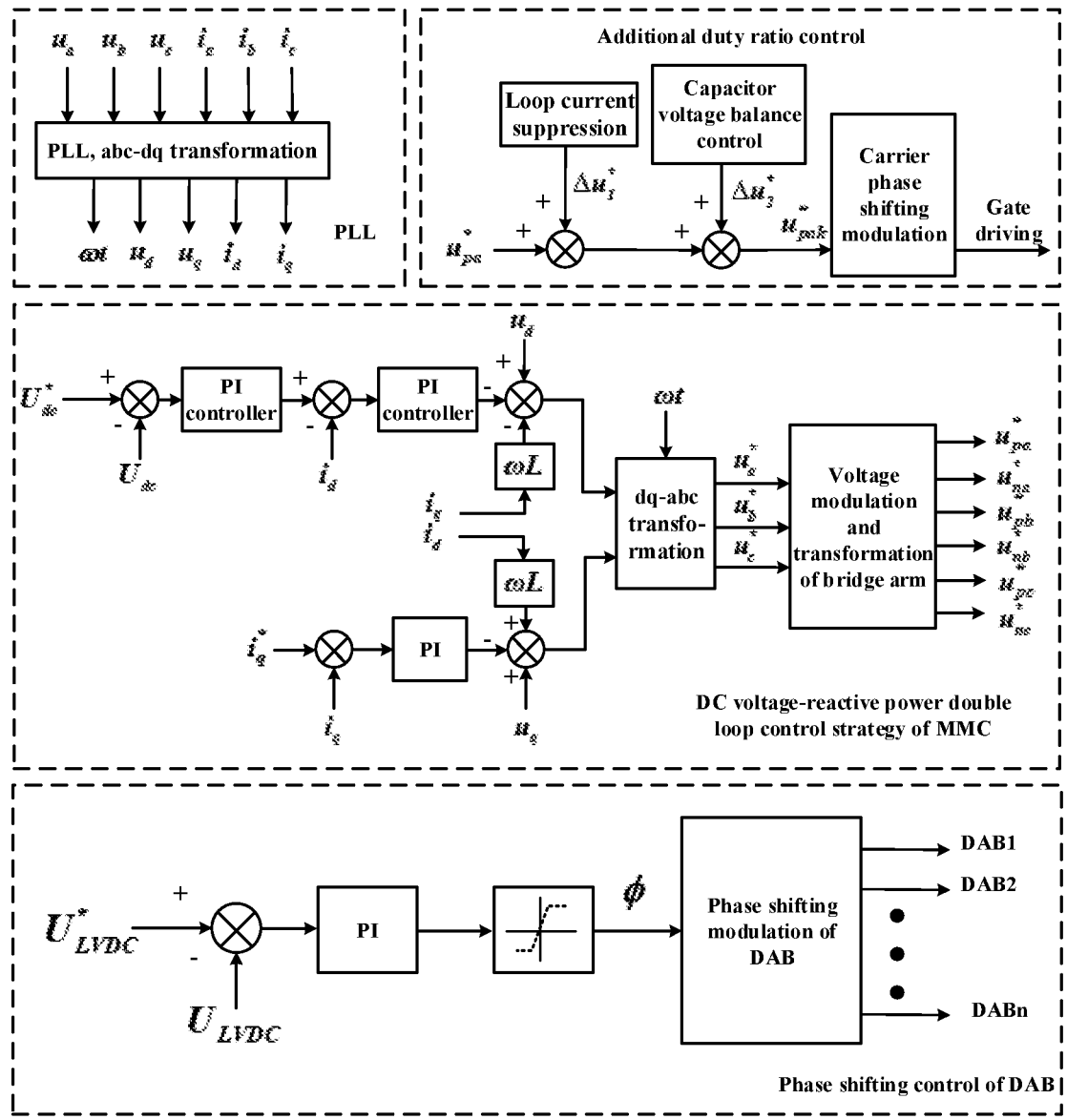
FIG. 6 is a control block diagram showing system operation of a solid-state transformer under the condition that a short-circuit fault occurs in a network connected to a low-voltage AC port in an embodiment of the present invention.

As shown in FIG. 6 which is a control block diagram of a solid-state transformer under a fault of a low-voltage AC port, when a short-circuit fault occurs in a network connected to the low-voltage AC port of the solid-state transformer, the solid-state transform changes a control strategy to lock a three-phase PWM inverter, isolate a low-voltage AC fault port and keep other ports to normally operate. The specific control process is that: firstly, the phases and d-axis and q-axis components of a voltage and a current of a medium-voltage AC side are acquired by a phase-locked loop (PLL) and dq transformation, so that it is convenient for the hybrid modular multilevel converter (MMC) to achieve control; the hybrid modular multilevel converter (MMC) is provided with a medium-voltage DC port and a medium-voltage AC port which are respectively connected with a medium-voltage DC network and a medium-voltage AC network, the hybrid modular multilevel converter (MMC) adopts DC voltage-reactive power double loop control, and a DC voltage and reactive power are subjected to double closed loop control to obtain modulation voltage command values of the upper and lower bridge arms of each phase, so that the reactive power of the AC side is controlled, and the voltage of a medium-voltage DC side is maintained to be stable; a corresponding compensation amount is additionally increased in the modulation voltage command value of each bridge arm by additional duty ratio control, and a corresponding switching tube is driven by carrier phase shifting modulation, so that loop current suppression and the voltage balance of the capacitors of the submodules are achieved; the input sides of the isolated dual-active-bridge converters (DAB) are connected with the DC sides of the submodules of the modular multilevel converter (MMC), the output sides thereof are connected in parallel to provide a low-voltage DC port connected with a low-voltage DC distribution grid, a distributed new energy source, stored energy and other flexible loads, the isolated dual-active-bridge converters (DAB) adopt phase shifting angle control, the voltage of the low-voltage DC bus is subjected to single closed loop control to obtain phase shifting angle command values of all the isolated dual-active-bridge converters (DAB), so that the voltage of the low-voltage DC bus is maintained to be stable; and the three-phase PWM inverter stops working.

According to the solid-state transformer having the uninterrupted operation ability under the AC/DC fault and the control method thereof in the above-mentioned embodiments of the present invention, the hybrid submodules are described by taking two-level half-bridge submodules and full-bridge submodules as examples, however, they are not limited to the above-mentioned two submodules in actual applications, and in theory, the hybrid submodules may extend to any level.

According to the above-mentioned embodiments of the present invention, on one hand, the solid-state transformer may be provided with the four ports including the medium-voltage DC port, the medium-voltage AC port, the low-voltage DC port and the low-voltage AC port which are beneficial to the interconnection of multi-voltage-grade and multi-form AC/DC hybrid distribution grids; on the other hand, the solid-state transformer has the uninterrupted operation ability under the AC/DC fault, the rapid switching of an operation mode of a device under a fault of any one port of the solid-state transformer and the interrupted operation of non-fault ports can be achieved, and thus, the power supply reliability of the established multi-voltage-grade and multi-form AC/DC hybrid distribution grids is improved.

The specific embodiments of the present invention are described as above. It should be understood that the present invention is not limited to the above-mentioned specific implementation manners, the skilled in the art may make various variations or modifications within the scope of the claims, which does not affect the essential content of the present invention.

We claim:

1. A method for controlling a solid-state transformer having an uninterrupted operation ability under an Alternating Current (AC)/Direct Current (DC) fault, wherein the solid-state transformer comprises a hybrid Modular Multilevel Converter (MMC), a plurality of isolated dual-active-bridge (DAB) converters and a three-phase full-bridge pulse width modulation (PWM) inverter, wherein bridge arms of the hybrid MMC comprise half-bridge submodules and full-bridge submodules, the half-bridge submodules and the full-bridge submodules are connected with input ends of the plurality of DAB converters via capacitors included in the half-bridge submodules and the full-bridge submodules, output ends of the plurality of DAB converters are connected in parallel to form a low-voltage DC bus, and the three-phase full-bridge PWM inverter is connected to the low-voltage DC bus; wherein the hybrid MMC is provided with a medium-voltage DC port and a medium-voltage AC port, wherein the medium-voltage AC port is connectable with a medium-voltage AC distribution grid, and the medium-voltage DC port is connectable with a medium-voltage DC distribution grid;

the low-voltage DC bus formed by connecting the output ends of the plurality of DAB converters in parallel forms a low-voltage DC port, and the low-voltage DC port is connectable with a low-voltage DC distribution grid; and the low-voltage DC bus forms a low-voltage AC port via the three-phase full-bridge PWM inverter, and the low-voltage AC port is connectable with a low-voltage AC distribution grid;

wherein when a short-circuit fault occurs in the medium-voltage DC distribution grid connected to the medium-voltage DC port of the hybrid MMC of the solid-stage transformer, the solid-state transformer has a DC fault current blocking ability and blocks a DC fault current by changing a control strategy to keep a voltage of the medium-voltage DC port at zero while keeping the medium-voltage AC port, the low-voltage DC port, and the low-voltage AC port operate normally, and the solid-state transformer performs a process of uninterrupted control of the medium-voltage DC port under the short-circuit fault;

wherein the process of uninterrupted control of the medium-voltage DC port under the short-circuit fault comprises:

firstly, in order to avoid influences of operation of the solid-state transformer by the short-circuit fault occurring to the medium-voltage DC port of the hybrid MMC of the solid-state transformer, a modulation voltage of the medium-voltage DC port is kept at a low voltage, so that a sum of modulation voltage values of an upper bridge arm and a lower bridge arm of the bridge arms of the hybrid MMC is set at the low voltage, and the low voltage of the medium-voltage DC port is selectively reduced to zero under a limit condition for supporting short-circuit tolerance of the medium-voltage DC port;

secondly, in order to ensure the normal operation of the medium-voltage AC port, a voltage of the medium-voltage AC port is maintained to be equal to an AC modulation voltage, so that for at least a phase A, modulation voltages of the upper and lower bridge arms satisfy the following conditions:

$$\begin{cases} u_{ap} = -U_m\sin(\omega t) \\ u_{an} = U_m\sin(\omega t) \end{cases}$$

wherein $u_{ap}$ and $u_{an}$ are the modulation voltages of the upper and low bridge arms respectively, $U_m$ is a voltage amplitude at the medium-voltage AC port, and wt is the phase of the phase A; and finally, in order to ensure the normal operation of the low-voltage DC port and the low-voltage AC port, active power of the low-voltage DC port and the low-voltage AC port is made equally and stably transmitted to the plurality of DAB converters via the hybrid MMC, and an analysis is implemented on currents of the upper bridge arm and the lower bridge arm of the bridge arms of the hybrid MMC and switching functions of the half-bridge submodules and the full-bridge submodules, so that for at least the phase A, the currents of the upper bridge arm and the lower bridge arm are respectively expressed as:

$$\begin{cases} I_{ap} = -\frac{1}{2}I_a(t) = -\frac{1}{2}I_m\sin(\omega t + \varphi) \\ I_{an} = +\frac{1}{2}I_a(t) = +\frac{1}{2}I_m\sin(\omega t + \varphi) \end{cases}$$

wherein $I_{ap}$ and $I_{an}$ are the current of the upper and lower bridge arms of the hybrid MMC for the phase A, $I_a(t)$ is the current of the medium-voltage AC port for the phase A, $I_m$ is a current amplitude of the phase A, and $\varphi$ is a power factor angle;

wherein for at least the phase A, a voltage of the upper bridge arm comprises a half-bridge submodule valve section and a full-bridge submodule valve section, so that in order to achieve equalized transmission of low-voltage DC power, separate modulation strategies are adopted for the half-bridge submodules and the full-bridge submodules, and expressions of the modulation voltages are shown as follows:

$$\begin{cases} u_{apHB} = U_1 - y_1 U_m\sin(\omega t) \\ u_{apFB} = -U_1 - y_2 U_m\sin(\omega t) \\ y_1 + y_2 = 1 \end{cases}$$

wherein $u_{apHB}$ and $u_{apFB}$ are the modulation voltages of the half-bridge submodules and the full-bridge submodules respectively; $U_1$, $y_1$ and $y_2$ are modulation command coefficients and are set according to system operation characteristics; in order to ensure that the voltages are varied within voltage variation ranges of the half-bridge submodule valve section and the full-bridge submodule valve section, values of the $U_1$, $y_1$ and $y_2$ satisfy the following conditions:

$$\begin{cases} 0 \leq u_{apHB} \leq nU_c \\ -nU_c \leq u_{apFB} \leq nU_c \end{cases}$$

wherein n is a number of the half-bridge submodules and the full-bridge submodules comprised in the half-bridge submodule valve section and the full-bridge submodule valve section, and $U_c$ is a rated voltage of the full-bridge submodules and the half-bridge submodules;

wherein S is average switching functions of the half-bridge submodules and the full-bridge submodules are respectively obtained as follows:

$$\begin{cases} S_{apHB} = \dfrac{U_1 - y_1 U_m\sin(\omega t)}{nU_c} \\ S_{apFB} = \dfrac{-U_1 - y_2 U_m\sin(\omega t)}{nU_c} \end{cases}$$

wherein a current flowing into the medium-voltage DC port and the low-voltage DC port of the half-bridge submodules and the full-bridge submodules is expressed as:

$$\begin{cases} i_{SMapHB} = S_{apHB}I_{ap} = \dfrac{U_m I_m y_1 \cos\varphi}{4nU_c} - \\ \dfrac{U_1 I_m \sin(\omega t + \varphi)}{2nU_c} - \dfrac{U_m I_m y_1 \cos(2\omega t + \varphi)}{4nU_c} \\ i_{SMapFB} = S_{apFB}I_{ap} = \dfrac{U_m I_m y_2 \cos\varphi}{4nU_c} + \\ \dfrac{U_1 I_m \sin(\omega t + \varphi)}{2nU_c} - \dfrac{U_m I_m y_2 \cos(2\omega t + \varphi)}{4nU_c} \end{cases}$$

wherein $i_{SMapHB}$ and $i_{SMapFB}$ are the currents at the medium-voltage DC port and the low-voltage DC port of the half-bridge submodules and the full-bridge submodules respectively, $$\dfrac{U_m I_m y_1 \cos\varphi}{4nU_c}$$

and $$\dfrac{U_m I_m y_2 \cos\varphi}{4nU_c}$$

are DC components and flow into the low-voltage DC port via a later-stage DAB converter of the plurality of DAB converters to generate active power; and other components are AC components acting on the capacitors included in the half-bridge submodules and the full-bridge submodules to generate voltage fluctuation of the capacitors, which does not affect power transmission at the low-voltage DC port and the low-voltage AC port, and power transmission from one single half-bridge submodule of the half-bridge submodules and one single full-bridge submodule of the full-bridge submodules to the plurality of DAB converters is expressed as follows:

$$\begin{cases} P_{DABapHB} = \dfrac{U_m I_m y_1 \cos\varphi}{4n} \\ P_{DABapFB} = \dfrac{U_m I_m y_2 \cos\varphi}{4n} \end{cases}$$

wherein $P_{DABapHB}$ and $P_{DABapFB}$ are power transmitting from the one single half-bridge submodule and the one single full-bridge submodule to the plurality of DAB converters, and wherein through calculation and analysis, equalized and stable transmission of the active power at the low-voltage DC port in an uninterrupted operation state is achieved by selecting the modulation command coefficients for the modulation voltages of the half-bridge submodules and the full-bridge submodules.

2. The method according to claim 1, wherein when a short-circuit fault occurs in one of the medium-voltage AC distribution grid, the medium-voltage DC distribution grid, the low-voltage AC distribution grid, and the low-voltage DC distribution grid that are respectively connected to the medium-voltage AC port, the medium-voltage DC port, the low-voltage AC port, and the low-voltage DC port of the hybrid MMC of the solid-state transformer, by locking the port connected to the one of the medium-voltage AC distribution grid, the medium-voltage DC distribution grid, the low-voltage AC distribution grid, and the low-voltage DC distribution grid in which the short-circuit fault occurs, operation of remaining ports of the hybrid MMC of the solid-state transformer is prevented from being affected, so that power supply reliability of an AC/DC hybrid distribution grid including the medium-voltage AC distribution grid, the medium-voltage DC distribution grid, the low-voltage AC distribution grid, and the low-voltage DC distribution grid is improved.

3. The method according to claim 1, wherein when the medium-voltage DC distribution grid, the medium-voltage AC distribution grid, the low-voltage DC distribution grid, and the low-voltage AC distribution grid that are respectively connected to the medium-voltage DC port, the medium-voltage AC port, the low-voltage DC port, and the low-voltage AC port are all in stable operation, the solid-stage transformer is in a normal operation condition, and energy flow among the medium-voltage DC port, the medium-voltage AC port, the low-voltage DC port, and the low-voltage AC port is controlled to maintain the stable operation of the medium-voltage DC distribution grid, the medium-voltage AC distribution grid, the low-voltage DC distribution grid, and the low-voltage AC distribution grid; wherein the low-voltage DC bus is connected with a DC side of the three-phase full-bridge PWM inverter, and an AC side of the three-phase full-bridge PWM inverter is connected with the low-voltage AC distribution grid;

the hybrid MMC controls a reactive power of the AC side of the three-phase full-bridge PWM inverter and maintains a voltage of the medium-voltage DC port to be stable by adopting DC voltage-reactive power double loop control; loop current suppression and voltage balance of the capacitors of the half-bridge submodules and the full-bridge submodules are achieved by additional duty ratio control in a modulation voltage;

the plurality of DAB converter control the active power of a phase shifting angle so as to maintain the low-voltage DC bus to be stable; and wherein the three-phase full-bridge PWM inverter maintains a voltage of the low-voltage AC port to be stable by constant AC voltage control.

4. The method according to claim 1, wherein when the short-circuit fault occurs in the medium-voltage DC distribution grid connected to the medium-voltage DC port of the hybrid MMC of the solid-stage transformer, the hybrid MMC controls a reactive power of an AC side of the three-phase full-bridge PWM inverter and maintains voltages of the capacitors included in the half-bridge submodules and the full-bridge submodules of the hybrid MMC to be constant by adopting total capacitor voltage-reactive power double loop control, so that rapid input of the solid-state transformer after the fault is cleared is facilitated.

5. The method according to claim 4 wherein when the short-circuit fault occurs in the medium-voltage DC distribution grid connected to the medium-voltage DC port of the hybrid MMC of the solid-stage transformer, and the low-voltage DC bus is connected with a DC side of a three-phase full-bridge PWM inverter, and an AC side of the three-phase full-bridge PWM inverter is connected with the low-voltage AC distribution grid, the full-bridge submodule valve section and the half-bridge submodule valve section of the hybrid MMC respectively adopt separate modulation strategies so that cooperative work of the half-bridge submodules and the full-bridge submodules and the equalized transmission of the active power at the low-voltage DC port of among the plurality of DAB converters are achieved; wherein loop current suppression and the voltage balance of the capacitors included in the half-bridge submodules and the full-bridge submodules are achieved by additional duty ratio control in a modulation voltage;

the plurality of DAB converters control the active power of a phase shifting angle so as to maintain the low-voltage DC bus to be stable;

the three-phase full-bridge PWM inverter maintains a voltage of the low-voltage AC port to be stable by constant AC voltage control; and wherein uninterrupted operation of the medium-voltage AC port, the low-voltage AC port, and the low-voltage DC port under the fault of the medium-voltage DC port is achieved.

6. The method according to claim 1, wherein when a short-circuit fault occurs in the medium-voltage AC distribution grid connected to the medium-voltage AC port of the solid-state transformer, a circuit breaker at the medium-voltage AC port blocks a fault current and isolates the medium-voltage AC fault port that is in fault, and a control strategy is changed to keep the medium-voltage DC port, the low-voltage AC port, and the low-voltage DC port operate normally; wherein the low-voltage DC bus is connected with a DC side of the three-phase full-bridge PWM inverter, and an AC side of the three-phase full-bridge PWM inverter is connected with the low-voltage AC distribution grid;

the hybrid MMC adopts total capacitor voltage control to maintain the voltages of the capacitors included in the half-bridge submodules and the full-bridge submodules of the hybrid MMC to be balanced;

the plurality of DAB converters control the active power of a phase shifting angle so as to maintain the voltage of the low-voltage DC bus to be stable; and wherein the three-phase full-bridge PWM inverter maintains a voltage of the low-voltage AC port to be stable by constant AC voltage control.

7. The method according to claim 1, wherein when a short-circuit fault occurs in the low-voltage DC distribution grid connected to the low-voltage DC port of the solid-state transformer, a control strategy is changed to lock the plurality of DAB converters and the three-phase full-bridge PWM inverter, isolate the low-voltage DC port that is in fault and keep the medium-voltage AC port and the medium-voltage DC port operate normally, wherein the low-voltage DC bus is connected with a DC side of the three-phase full-bridge PWM inverter, and an AC side of the three-phase full-bridge PWM inverter is connected with the low-voltage AC distribution grid; wherein the hybrid MMC controls the reactive power of the AC side of the three-phase full-bridge PWM inverter and maintains the voltage of the medium-voltage DC port to be stable by adopting DC voltage-reactive power double loop control; and wherein loop current suppression and the voltage balance of the capacitors included in the half-bridge submodules and the full-bridge submodules are achieved by additional duty ratio control in a modulation voltage.

8. The method according to claim 1, wherein when a short-circuit fault occurs in the low-voltage AC distribution grid connected to the low-voltage AC port of the solid-state transformer, a control strategy is changed to lock the three-phase full-bridge PWM inverter, isolate the low-voltage AC port that is in fault and keep to the medium-voltage AC port, the medium-voltage DC port, and the low-voltage DC port operate normally; wherein the low-voltage DC bus is connected with a DC side of the three-phase full-bridge PWM inverter, and an AC side of the three-phase full-bridge PWM inverter is connected with the low-voltage AC distribution grid;

the hybrid MMC controls the reactive power of the AC side of the three-phase full-bridge PWM inverter and maintains the voltage of the medium-voltage DC port to be stable by adopting DC voltage-reactive power double loop control;

loop current suppression and the voltage balance of the capacitors included in the half-bridge submodules and the full-bridge submodules are achieved by additional duty ratio control in a modulation voltage; and wherein the plurality of DAB converters control the active power of a phase shifting angle so as to maintain the low-voltage DC bus to be stable.

* * * * *